United States Patent Office 3,245,807
Patented Apr. 12, 1966

3,245,807
FRUIT PRODUCT AND METHOD OF PREPARING SAME
Edward E. Colby, Cincinnati, Ohio, assignor to The Procter & Gamble Company, Cincinnati, Ohio, a corporation of Ohio
No Drawing. Filed Jan. 29, 1962, Ser. No. 169,631
2 Claims. (Cl. 99—186)

This invention relates to a prepared fruit product and to a method for preserving the same. More particularly, this invention relates to a canned fruit product which retains the natural flavor and texture of the fresh fruit from which it is prepared and which is eminently suitable for use as a baked cake topping.

Fresh fruits can be preserved by a variety of methods today such as canning, freezing, dehydrating and dehydro canning. Canning is the most satisfactory method for preserving fruit from the standpoint of providing the consumer with a product which can be readily stored for long periods of time without refrigeration or other specialized equipment and which can be conveniently used immediately when desired without further treatment of the fruit. Nevertheless, conventional canning methods present serious drawbacks to the preparation of a preserved fruit product which is satisfactory for applications such as cake topping, where the characteristics of a fresh fruit are desirable.

It is customary during the usual canning process to subject the fruit to a combination of time, temperature, and vacuum in order to properly sterilize the fruit and to prevent corrosion of the tinplate which is used in the containers. The rigorous conditions normally used in such canning cause deleterious changes in the flavor, nutrients and texture of the fresh fruit.

Although there are sundry reasons for the blanching of fruits, it has been considered essential by canning technologists to blanch certain fruit at high temperatures, usually with steam, in order to inactivate or destroy enzymes and organisms which cause deterioration of the fruit and to wilt the fruit so that it can be solidly packed in the can. In the particular case of apples, blanching at high temperatures has been thought to be necessary to prevent enzymatic browning and to augment the displacement of oxygen during the normal exhausting or vacuum de-aeration of apples prior to can sealing. The removal of oxygen facilitates the inactivation or inhibition of the enzymes which cause browning and helps to prevent the corrosion of tinplate which has been found to be accelerated by the combined presence of oxygen and the malic acid found in apple tissue.

After the usual blanching and exhausting steps the fruit is normally submerged in a liquid in the can. Complete filling of the can with liquid matter helps to prevent the re-entry of air into the can before it is permanently sealed.

The combination of the aforesaid steps of the usual canning process results in a soft, plump fruit that has lost much of its original flavor and nutrient value. While this type of fruit is satisfactory for some purposes, it is not well suited for use as a baked cake topping where the texture of the fruit is of particular importance, and it has been customary in the past to use fresh fruit to obtain good results.

Accordingly, it is an object of this invention to prepare a canned fruit product which substantially retains the natural texture, flavor, and nutrient value of the fresh fruit from which it is prepared.

Another object is to prepare a ready-to-use canned fruit product having the characteristics of a fresh fruit whereby it is particularly suitable to be baked as a topping on a cake such as coffee cake.

It has now been found possible to preserve a moist, tasty and crisp fruit product having the natural flavor, form, and texture of fresh fruit by introducing certain novel modifications to conventional canning procedures. In order to prepare a canned fruit product which retains the said characteristics the entire canning process, up to and including can sealing, is carried out at temperatures less than about 110° F. It is essential to expel the gaseous oxygen from the porous fruit tissues and replace the same with a liquid without distending or constricting the natural fibrous consistency of the fruit tissues. The infused fruit must then be packed and sealed in containers under a high vacuum with preferably no additional liquid added thereto.

Briefly stated, the process of this invention comprises placing unblanched fruit pieces in a closed vessel and subjecting the occluded fruit to a vacuum in excess of about 15 inches of mercury. The evacuated gas cavities are then infused with an edible liquid which may contain solids dissolved or suspended therein. The excess liquid is completely drained and the infused fruit pieces are then placed in cans and sealed under a vacuum in excess of about 15 inches of mercury and at a temperature of less than about 110° F. After the cans are permanently sealed they are heated sufficiently to attain commercially recognized sterilization, usually in the range of about 190°–210° F. for about 5–20 minutes, and then cooled rapidly in water to less than about 100° F.

The present invention is applicable to all of those fruits which are commonly canned, such as apples, pears, peaches, apricots, cherries, strawberries, raspberries, blueberries, blackberries, and pineapple. By means of this invention it is possible to preserve these and other fruits in a relatively natural state with no significant loss of the flavor and texture of the fresh uncooked fruit.

The fruit that has been canned according to the process of this invention also retains its natural flavor, color, and texture for long storage periods. Thus, it is possible to market a canned fruit product through conventional distribution channels to the consumer for ultimate use in applications where fresh fruit would normally be used, such as in prepared cakes, pies, and other baked goods.

For example, in the preparation of coffee cakes having a fruit topping such as apple topping, or pancakes such as apple pancakes and blueberry pancakes, the housewife is reluctant to use any fruit other than fresh produce. The preserved fruit products which are canned by conventional processes are unsatisfactory for such purposes primarily because they have lost their fresh, natural texture. The mushy or soggy texture of the ordinary canned fruit is considered inferior to the crisp, firm texture of the fresh fruit. However, by using the preserved fruit of this invention in the preparation of such foods, the consumer is provided with a convenient and satisfactory canned fruit product having a texture comparable to that of fresh fruit.

In preparing the canned fruit product of this invention, it is first necessary to subject the raw fresh fruit to the usual steps of peeling, coring, and cutting into segments or pieces. The fruit is then thoroughly de-aerated in order to expel the free gases contained therein.

Satisfactory removal of oxygen and other gases from the fruit tissues is accomplished by subjecting the fruit to a vacuum in excess of about 15 inches of mercury. Preferably, a vacuum in the range of about 20–25 inches of mercury should be used for a period of about 10–20 minutes. It is also preferable to remove the uncombined gases from the fruit tissues by this procedure aa a temperature which does not exceed about 110° F. Although the use of higher temperatures during vacuumizing facilitates the removal of gaseous substances, it is desirable to use a temperature less than about 110° F. for purposes of this invention in order to avoid damage to the fruit in the form of texture, flavor, and nutrient losses which would otherwise occur.

It has been found that the natural flavor and texture of the canned fruit product of this invention can be enhanced, without producing deleterious effects upon the fruit, by incorporating therein various additives during the step in which the porous fruit tissues are infused with liquid which replaces the evacuated gases. For example, in order to increase the tartness or otherwise enhance the flavor of the fruit it is desirable to add small amounts of edible acids such as citric acid, malic acid, fumaric acid, tartaric acid, acetic acid, oxalic acid, ascorbic acid and lactic acid. Various other substances such, for example, as the alkaline earth metal salts, and in particular the calcium salts such as calcium chloride, calcium lactate, calcium citrate, calcium malate and calcium phosphate (tribasic), can be added to improve the texture of the fruit. These compounds and other ingredients in various amounts and combinations can be conveniently added to the fruit for the said purpose during the infusion step.

In some cases it is desirable to add agents to help prevent enzymatic browning. Useful ingredients for this purpose are sodium chloride, citric acid, and tartaric acid.

Minor amounts of other additives such as sweetening agents, anti-oxidants and vitamins may also be incorporated in the infusion liquid if desired.

After the oxygen and other gases have been expelled from the fruit by vacuum exhaustion, the vacuum is broken with water which may contain various of the aforesaid additives in solution. The concentration of the additives in the water solution can be about 0.01% to about 3%, and the solution should be allowed to cover the fruit for several minutes in order to provide sufficient infusion of additives throughout the fruit tissues. Infusion with the said additives in the manner described provides a thorough dispersal of the flavor or other ingredient in the fruit tissues without the necessity of packing a fruit product that is submerged in liquid in the can.

The amount of liquid to be added during the infusion should be sufficient to fill the porous fruit tissues from which the gases were expelled during the vacuumizing step. The replacement of gas with a liquid as described herein increases the density of the fruit product so that a raw fruit such, for example, as an apple or blueberry having a bulk density of about 0.5 to about 0.6 gram per cc. will attain a final bulk density of about 0.65 to about 0.8 gram per cc.

It is also essential to saturate these evacuated gas cavities in a manner so that the natural fibrous texture of the fruit is neither distended nor constricted. In order to satisfactorily accomplish this objective it has been found preferable to conduct the previous vacuumizing at temperatures less than about 110° F. If higher temperatures are used, the fruit tissues are weakened and made highly susceptible to further damage from the subsequent liquid addition. Moreover, higher temperatures applied to the fruit in unsealed cans or otherwise in the presence of oxygen also produce serious losses of flavor volatiles.

After the fruit has been infused with the liquid which breaks the vacuum, the excess liquid is drained. The fruit is then ready to be packed in containers and permanently sealed. Packing should be conducted in a manner whereby the fruit pieces are neither crushed nor submerged in liquid in order to provide a canned product in which the interstices between the fruit pieces in the container are substantially free of liquid. The cans are then sealed and sterilized. Sealing should be done at room temperature under a vacuum in excess of 15 inches of mercury, and sterilizing can be accomplished by holding the sealed cans in hot water at temperatures in excess of about 200° F. for about 5–20 minutes. The specific sterilization conditions will depend somewhat upon the size of the can, a longer heating time being required for a larger can since it is generally desirable to obtain a can center temperature in excess of about 190° F. without increasing the temperature of any of the fruit above about 210° F. The cans should then be quickly cooled to less than about 100° F. or to about room temperature. Sterilization of the sealed fruit product in the manner described has been found to be sufficient to prevent deleterious effects upon the color, flavor, and texture of the fruit.

The following examples are illustrative of the present invention, but the invention is not limited thereto, other variations being readily discernible to those skilled in the art after reading the description of the invention herein contained.

*Example 1*

A batch of York Imperial apples, size 2½ to 3½ inches in diameter, and having a bulk density of about 0.54 g. per cc., was peeled, cored, and sliced. Each apple was cut into four segments and each segment was cut perpendicular to the core into ¼-inch thick pieces. The fruit pieces were placed in a basket inside a vessel. The vessel was sealed and the fruit subjected to a vacuum of 25 inches of mercury for 10 minutes. The vacuum was then broken with sufficient water to cover the fruit. The water contained in solution 0.2% calcium lactate, 1.5% citric acid, and 0.75% sodium chloride. After standing for 5 minutes, the vessel was opened and the water solution drained from the fruit. The fruit pieces were then placed in 303 x 109 sanitary cans, in the amount of 4 oz. per can, and closed at room temperature under conditions sufficient to give 18 inches of mercury vacuum in the can after sealing. The entire canning process up to this point was carried out at temperatures under 100° F. The sealed cans were placed in water having a temperature of about 210° F. and held there for about 10 minutes. The cans were then cooled for about one hour in water having a temperature of about 50° F.

(a) An examination of the cans of fruit was made immediately after the aforesaid packing. The apple product was found to have a firm, crisp, moist texture and tart flavor. No browning of the fruit was observed, and no enzyme activity was detected as shown by the absence of darkening of the fruit when treated with a weak solution of catechol. The apple product had a bulk density of about 0.70 gram per cc.

(b) An examination of the canned fruit was made after a 7½ month storage period at room temperature. It was found that the stored fruit product retained the same color, flavor, and texture as in (a). An examination of the interior of the cans before and after the 7½ month storage period showed no noticeable corrosive effect upon the tinplate during the said period.

*Example 2*

York apples were treated as in Example 1, above, with the exception that the vacuum-breaking medium was a water solution which contained by weight 1.5% malic acid and 0.5% sodium chloride. The same results as in Example 1 were noted.

*Example 3*

A batch of frozen wild blueberries was thawed and placed in a sealed vessel. The thawed blueberries had a bulk density of about 0.535 gram per cc. A vacuum of 20 inches of mercury was applied to the fruit for a period of 10 minutes. The vacuum was then broken with sufficient water to cover the fruit. The water contained in solution 0.2% calcium lactate. After standing for 5 minutes, the vessel was opened and the water solution drained from the fruit. The blueberries were then placed in 303 x 109 open top sanitary cans, in the amount of 4 oz. per can. Sealing of the cans was accomplished with a mechanical vacuum closing machine at room temperature and under a vacuum of 22 inches of mercury. The entire canning process up to this point was conducted at temperatures less than 100° F. The sealed cans were sterilized for 5 minutes in boiling water and then rapidly cooled to about room temperature. The canned blueberries had a very firm texture, a tasty flavor, and a bulk density of 0.778 gram per cc.

When other common canning fruits such as pears, peaches, apricots and pineapple are substituted for the applies and blueberries in the above examples, substantially the same results are obtained with respect to firm texture and tasty flavor.

*Example 4*

A dry cake mix was prepared by mixing together the following ingredients:

| | Weight percent |
|---|---|
| Granulated sugar | 46.2 |
| Wheat flour | 40.5 |
| Plastic triglyceride shortening containing mono- and diglyceride emulsifiers | 10.5 |
| Sodium chloride | 0.9 |
| Sodium bicarbonate | 0.5 |
| Sodium acid pyrophosphate | 0.7 |
| Locust bean gum | 0.66 |

Flavoring, minor amount.

A batter was then prepared by mixing 310 grams of the said dry cake mix with 120 grams of water for 1 minute. The batter was poured into a greased pan and 114 grams of apple pieces, which had been canned according to the process of Example 1, were spread evenly over the batter surface.

A dry topping mix of the following ingredients was then prepared:

| | Weight percent |
|---|---|
| Granulated sugar | 40.7 |
| Dextrose | 26.3 |
| Wheat flour | 17.0 |
| Plastic triglyceride shortening | 14.6 |
| Spice | 1.4 |

The said dry topping mix was then sprinkled evenly over the applies and the cake was baked for 30 minutes at 375° F. The resulting baked product consisted of a cake base covered with a tasty blend of apples, sugar and spices, melted together to form a heterogeneous mass that neither floated on top of the cake nor sank to the bottom. The baked apple pieces retained a significant degree of their fresh texture and had an enhanced flavor level, in comparison with apples which had been subjected to a short (1 to 2 minute) blanching step with steam during a conventional canning process prior to sealing of the cans and which were not infused with an edible liquid in accordance with the process of Example 1.

Example 4 demonstrates the unique combination of apples prepared in accordance with the process described in Example 1 and baked as a cake topping. The process of Example 1 is eminently suitable in the particular case of apples, since the loss of the natural firm and crisp texture which occurs during conventional canning processes and subsequent baking has been particularly noteworthy with that fruit.

The apple product of Example 1 has the additional advantage in that it can be directly incorporated as a discrete package in a dry culinary mix to provide the consumer with a convenient ready-to-use combination for preparing a baked coffee cake topped with canned apple slices having the characteristics of fresh apple. Heretofore, it has been necessary for the consumer to procure fresh apples and carry out the tedious process of cleaning, peeling, coring and cutting into pieces in addition to preparing the usual cake batter in order to provide a fruit-topped coffee cake of the type herein described.

It will be apparent that culinary fruit-containing combinations other than the heretofore described product may be made in accordance with the invention. For example, pies such as apple, peach, and berry pies; fruit tarts and other pastries in general; and coffee cakes and other fruit-topped cakes may be prepared in accordance with the invention and will have the advantages described therefor.

These and other fruit-containing combinations can be conveniently prepared from dry culinary mixes which contain a discrete package of the hereinbefore-described canned fruit product in the dry ingredients comprising flour, shortening and other usual batter- and dough-forming ingredients.

In addition to their use in a dry culinary mix, many of the fruits, such as pears, peaches, apples and blueberries, processed in accordance with Example 1, may be used in salads and other fruit dishes where either fresh or conventionally canned fruits are normally used.

What is claimed is:

1. A process for preserving apple product in a firm, crisp, moist and tasty state and having substantially the same size, shape and texture of fresh apple pieces which comprises exhausting raw, fresh, unblanched and uncrushed apple pieces in a vacuum of from about 15 to 25 inches of mercury for a period of from about 10 to about 20 minutes and sufficient to expel the gases therefrom, infusing the exhausted apple pieces to replace the expelled gases by submerging the apple pieces in an aqueous solution of from about 0.01% to about 3% of apple improvers selected from the group consisting of citric acid, malic acid, fumaric acid, tartaric acid, acetic acid, oxalic acid, ascorbic acid, lactic acid, calcium chloride, calcium lactate, calcium citrate, calcium malate, and tricalcium phosphate, draining the exess non-infused solution to provide a bulk density of apple product of from about 0.65 to about 0.8 g. per cc., permanently sealing the infused apple pieces in a can under a vacuum of from about 15 to 25 inches of mercury, said exhausting, infusing, and sealing being conducted at temperatures below about 110° F., thereafter heating the sealed product at elevated temperatures of from 190° F. to 210° F. for a period of from about 5 to about 20 minutes until the can center reaches a temperature of about 190° F., then quickly cooling the can to less than about 100° F.

2. A firm, crisp, moist and tasty preserved apple product comprising uncrushed apple having substantially the same size, shape and texture of fresh untreated apple pieces, prepared by exhausting raw, fresh, unblanched and uncrushed apple pieces in a vacuum of from about 15 to 25 inches of mercury for a period of from about 10 to about 20 minutes and sufficient to expel the gases therefrom, infusing the exhausted apple pieces to replace the expelled gases by submerging in an aqueous solution of from about 0.01% to about 3% of apple improvers selected from the group consisting of citric acid, malic acid, fumaric acid, tartaric acid, acetic acid, oxalic acid, ascorbic acid, lactic acid, calcium chloride, calcium lactate, calcium citrate, calcium malate, and tricalcium phosphate, draining the excess non-infused solution to provide a bulk density of apple product of from about 0.65 to about 0.8 g. per cc., permanently sealing the infused apple pieces in a can under a vacuum of from about 15 to 25 inches of mercury, said exhausting, infusing and sealing being conducted at temperatures below about 110° F., thereafter heating the sealed product at elevated temperatures of from 190° F. to 210° F. for a period of from about 5 to about 20 minutes until the can center reaches a temperature in excess of about 190° F., then quickly cooling the can to less than about 100° F.

References Cited by the Examiner

UNITED STATES PATENTS

| 1,046,716 | 12/1912 | Arnold | 99—186 |
| 1,121,007 | 12/1914 | Ginaca | 99—186 |

(Other references on following page)

UNITED STATES PATENTS

| | | | |
|---|---|---|---|
| 1,782,761 | 11/1930 | McCrosson | 99—186 |
| 1,890,475 | 12/1932 | Todd | 99—102 |
| 1,956,770 | 5/1934 | McCrosson | 99—186 |
| 2,344,151 | 3/1944 | Kasser | 99—154 |
| 2,672,422 | 3/1954 | Patterson | 99—94 X |
| 2,772,171 | 11/1956 | Montiminy | 99—172 |
| 2,798,813 | 7/1957 | Patterson | 99—94 X |
| 2,916,380 | 12/1959 | Finucane et al. | 99—94 |
| 3,015,429 | 1/1962 | Morici | 99—172 X |

OTHER REFERENCES

Lord: "Everybody's Cook Book," New York, 1924, page 254.

A. LOUIS MONACELL, *Primary Examiner.*

HYMAN LORD, *Examiner.*